United States Patent [19]
Bradford

[11] 3,958,686
[45] May 25, 1976

[54] CONVEYOR CONSTRUCTION

[76] Inventor: Robert C. Bradford, 908 Cram Lane, Albion, Mich. 49224

[22] Filed: Sept. 23, 1974

[21] Appl. No.: 508,181

[52] U.S. Cl. .............................................. 198/189
[51] Int. Cl.² ........................................ B65G 17/06
[58] Field of Search .................... 198/189, 194, 136

[56] References Cited
UNITED STATES PATENTS

| | | | |
|---|---|---|---|
| 3,094,206 | 6/1963 | Stewart et al. ....................... | 198/189 |
| 3,189,164 | 6/1965 | Robinson, Jr. et al. .............. | 198/189 |

Primary Examiner—James B. Marbert
Attorney, Agent, or Firm—Woodhams, Blanchard and Flynn

[57] ABSTRACT

A conveyor system comprising an endless conveyor chain having load-supporting members thereon. The chain is comprised of interconnected, substantially identical links made of rod stock and constructed and arranged to permit flexing of the chain in the two directions perpendicular to the direction of movement of the chain. The links have laterally projecting ears for engagement with guides or driving devices for the chain.

9 Claims, 13 Drawing Figures

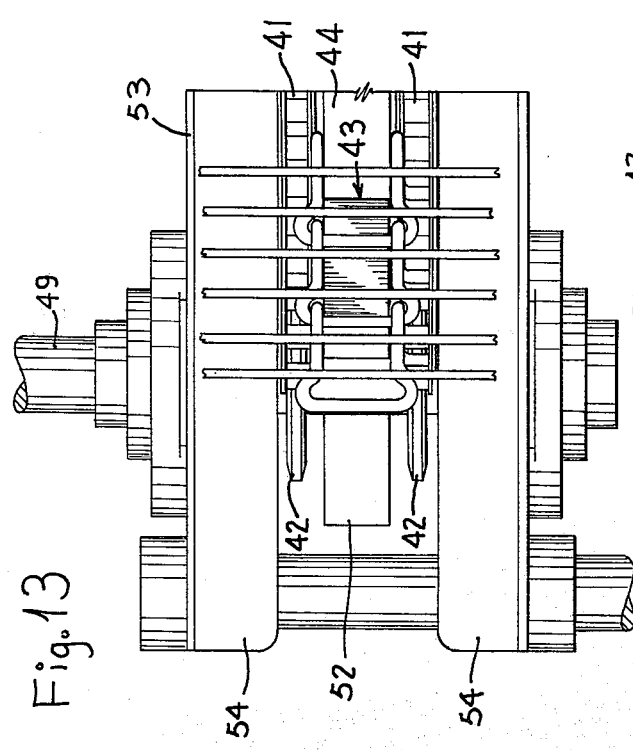
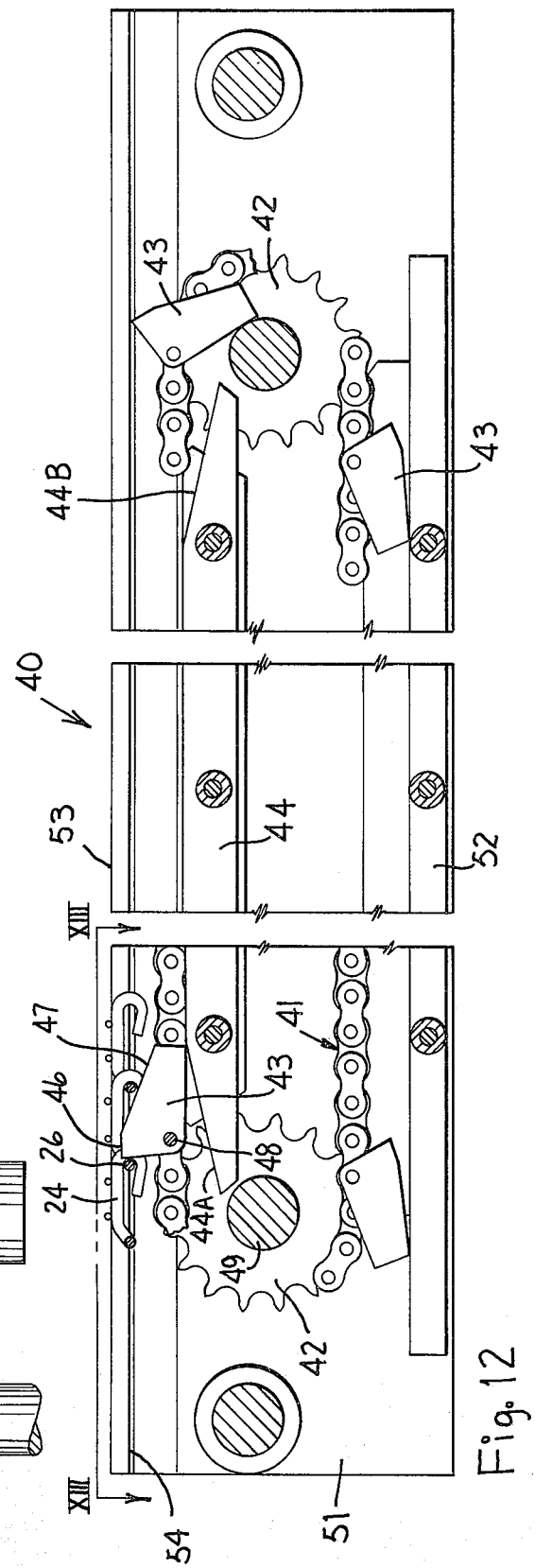
Fig. 13
Fig. 12

1

CONVEYOR CONSTRUCTION

BACKGROUND OF THE INVENTION

1. Field of the Invention

This invention relates to a conveyor system and particularly to an endless conveyor comprising an endless driving chain having load-supporting slats or rods thereon and adapted for conveying articles.

2. Description of the Prior Art

A wide variety of endless salt or rod-type conveyor systems have been proposed for conveying various articles. For example, a common endless conveyor comprises a standard roller chain having load supporting rods or slats secured thereon and adapted for moving articles through a path. One typical usage of such conveyors is to move freshly-baked bread through a cooling zone. Conventionally the bread is moved through a spiral path, and possibly additional horizontal or vertical paths, while the bread is cooling. It has been proposed to use a single, endless, chain-type conveyor for this purpose, but the prior apparatuses of this type have been unduly complex and expensive. In particular, the structure of the chain thereof has comprised a large number of interconnected parts capable of permitting various horizontal and vertical flexing movements of the conveyor as it moves through its path of movement. The prior apparatuses of this type have been unduly complex and, therefore, are more expensive to manufacture and require more maintenance than is desired. Further, in many cases, the prior apparatuses have various pockets or dead spaces in which materials, such as bread particles, can collect. This is undesirable because it can cause various difficulties in operation and it is unsanitary. A further problem with the prior art apparatuses has been the difficulty of cleaning same.

SUMMARY OF THE INVENTION

According to the invention, there is provided a conveyor system comprising an endless conveyor chain having load-supporting members thereon. The chain is comprised of a series of substantially identical, interconnected links, each link being made of one-piece rod stock. Each link comprises a transversely extending bight having a pair of legs extending from the opposite ends of the bight in the same direction longitudinally of the chain. The legs have an upper intermediate portion to which the load supporting members are attached. The legs also have a reversely curved end portion underlying the intermediate portion and defining therewith a slot. The bight of the adjacent link is received in this slot so that the links are connected together, but are capable of relative hinging movement both vertically and, to a limited extent, horizontally relative to each other. Further, the conveyor chain links each have at least one sidewardly projecting ear which is engageable with guide means or drive devices for the conveyor chain so that the conveyor chain can be closely guided as it moves through a path involving both horizontal and vertical direction changes and without permitting sagging of the chain or other irregular operation thereof.

BRIEF DESCRIPTION OF THE DRAWINGS

Referring to the attached drawings:

FIG. 12 is a longitudinal sectional view of a modified drive arrangement.

FIG. 13 is a top view along the line XIII—XIII of FIG. 12.

DESCRIPTION OF THE PREFERRED EMBODIMENT

Figure 1:
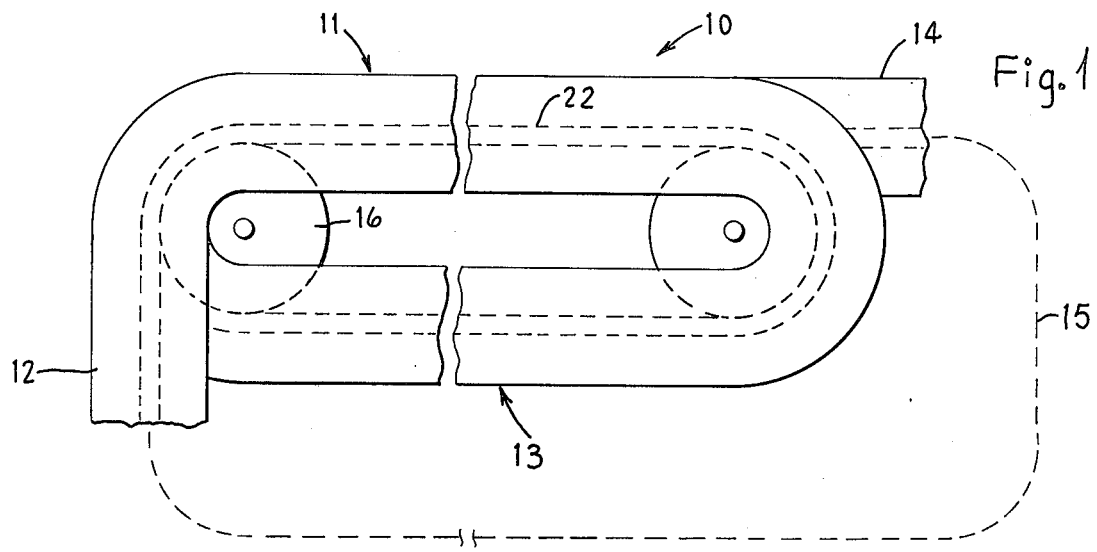
FIG. 1 is a schematic plan view of a conveyor system embodying the invention.
Figure 2:
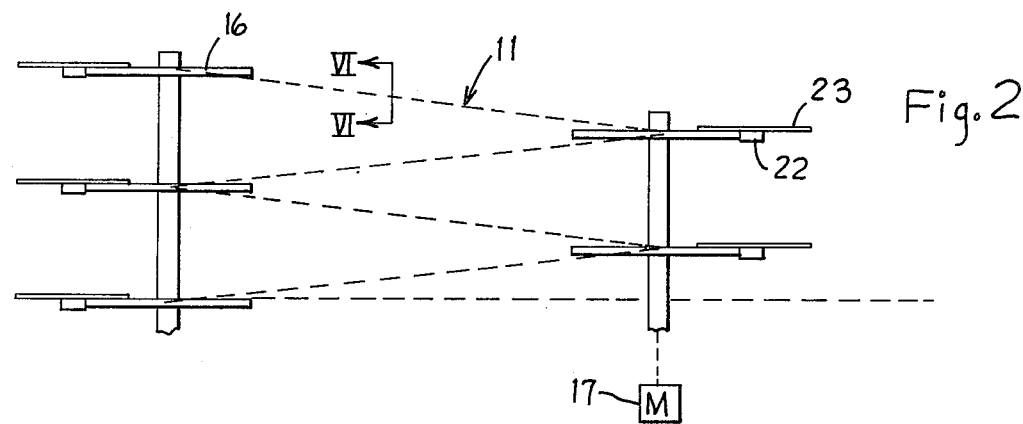
FIG. 2 is a schematic elevational view of the system shown in FIG. 1.

Referring to FIGS. 1 and 2, there is illustrated a conveyor system 10 comprising an endless conveyor 11 which includes sections that move in various horizontal and vertical directions. As illustrated, the conveyor system 10 includes a straight feed section 12, a spiral section 13, a straight discharge section 14 and a return section 15. In the spiral section 13, the conveyor moves through a substantially spiral path and its movement is guided by the sprockets 16. The sprockets are mounted on shafts and one of the shafts can be rotated by a motor 17 to drive the conveyor. This general type arrangement is well known and forms no part of this invention. It will be understood that the invention can be embodied in endless conveyors adapted for a wide variety of different paths of movement.

Referring to FIGS. 3–9, the conveyor 11 comprises a conveyor chain 22 having load supporting members 23 attached thereto. The conveyor chain 22 is located centrally between the opposite ends of the load supporting members 23. The load supporting members 23 are herein shown as being straight elongated rods. The two rods mounted on each of the conveyor links can be connected together at their outer ends to form a one-piece elongated loop. It will be understood, however, that the load supporting members 23 can be slats or other shapes as required to meet the requirements of a particular installation.

Figure 3:
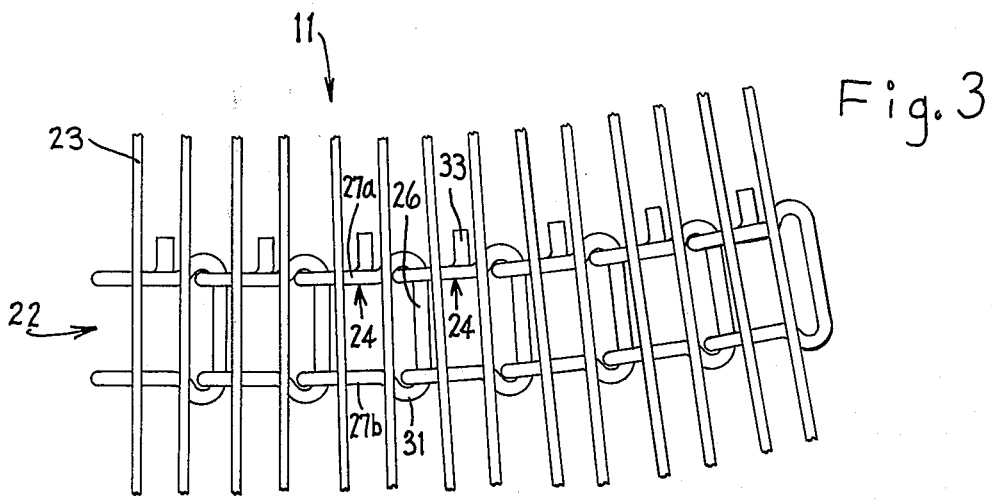
FIG. 3 is a plan view of a portion of the endless conveyor.
Figure 4:
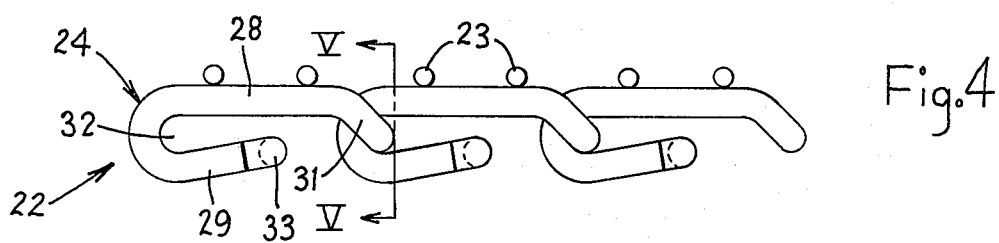
FIG. 4 is a side view of the conveyor illustrated in FIG. 3.
Figure 5:
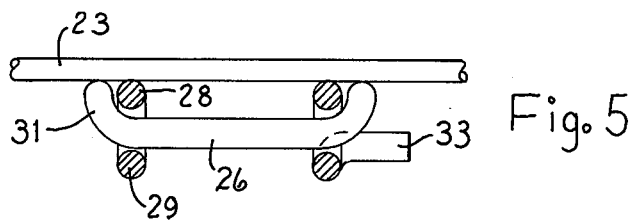
FIG. 5 is a sectional view taken along the line V—V of FIG. 4.

The conveyor chain 22 is comprised of a series of substantially identical, interconnected links 24. Each link 24 is made of a one-piece rod. As illustrated in FIG. 3, each link 24 is generally U-shaped in plan view and it comprises a transversely extending bight 26 having a pair of legs 27a, 27b extending in parallel therefrom in the same direction longitudinally of the chain. The legs 27a and 27b each comprise an upper, substantially planar, intermediate portion 28 and a reversely curved end portion 29, both of which portions lie in the same vertical plane. Corresponding portions of the two legs are laterally aligned with each other. The length of the bight 26 in a direction transverse to the longitudinal axis of the chain is greater than the corresponding spacing between the legs 27a, 27b. Further, the bight 26 is offset downwardly from the upper intermediate portions 28 of the legs and the ends of said bight are connected to the adjacent ends of the intermediate portions of the legs by the upwardly inclined inwardly curved connecting portions 31. Thus, the bight 26 lies below the substantially planar intermediate portions 28 of the legs.

The reversely curved end portions 29 of the legs underlie the upper intermediate portions 28 of the legs and define therewith slots 32, each having a rounded closed end. The bight 26 of the adjacent link is received in the slots 32 so as to couple adjacent links together. For this purpose the bight 26 is longitudinally aligned with the slots 32 and the connecting portions 31 extend outside of the reversely curved parts of the end portions 29 of the adjacent link. It will be observed that the vertical dimension of the slot 32, adjacent to the rounded end thereof is larger than the thickness of the rod stock of the bight portion 26 so that said bight portion can move lengthwise in the slot to a limited extent. This construction thus permits pivoting movement of adjacent links with respect to each other both vertically and to a limited extent horizontally. The conveyor, therefore, can move through vertical inclines or around curves of relatively large radius. The load supporting members 23 are designed so as to permit any required horizontal flexing of the conveyor. The minimum limit of the radius of curvature of such horizontal flexing movement is determined by the position at which the radially inner ends of the load supporting members crowd against each other.

The free end of the end portion 29 is bent upwardly to a position close to the underside of the intermediate portion 28 of the leg so as to retain the bight portion 26 of the adjacent link in the slot 32. The free end of at least one of the end portions 29 is bent transversely outwardly to form an ear 33 that extends sidewardly from the chain to a location beyond the adjacent connecting portion 31. This ear 33 serves to engage various driving and guiding members, to be described below, so that the travel of the conveyor can be closely guided to assure smooth and uniform movement.

Figure 6:
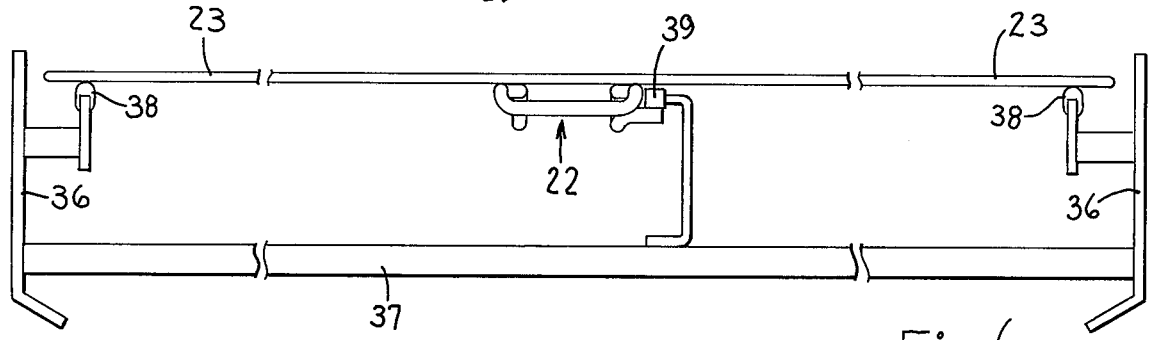
FIG. 6 is a view taken along the line VI—VI of FIG. 2.

As illustrated in FIG. 6, during certain portions of its travel the conveyor 4 can be associated with a stationary framework comprising side rails 36 and a transverse connecting member 37. The side rails 36 can be supported at suitable intervals by a framework or supporting posts in accordance with conventional practice. The side rails 36 have low friction guides 38 mounted thereon for engaging the load supporting members close to the outer ends thereof in order to support and guide movement thereof. Further, the ear 33 can be engaged by a low-friction, hold-down member 39 supported on the framework whereby the movement of the conveyor is closely guided.

Figure 8:
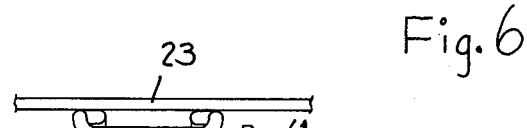
FIG. 8 is a view taken along the line VIII—VIII of FIG. 7.
Figure 7:
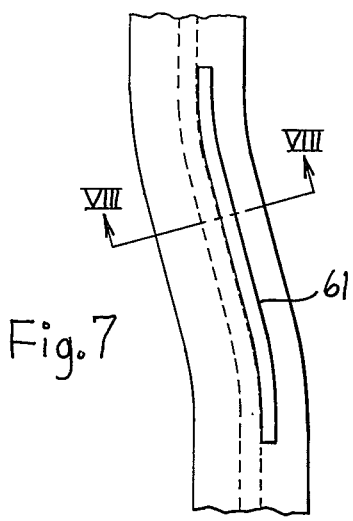
FIG. 7 is a schematic plan view of a portion of the conveyor and showing how its direction of movement can be modified in both a horizontal and vertical direction.

In addition, as illustrated in FIGS. 7 and 8, the ears 33 can be used to assure closely guided horizontal shifting and/or vertical upward movement of the conveyor. For example, there can be provided an elongated, low-friction, guide shoe 61 which engages the outer ends and/or the underside of the ears 33 in order that the direction of movement of the conveyor can be shifted both horizontally and vertically upwardly.

Figure 9:
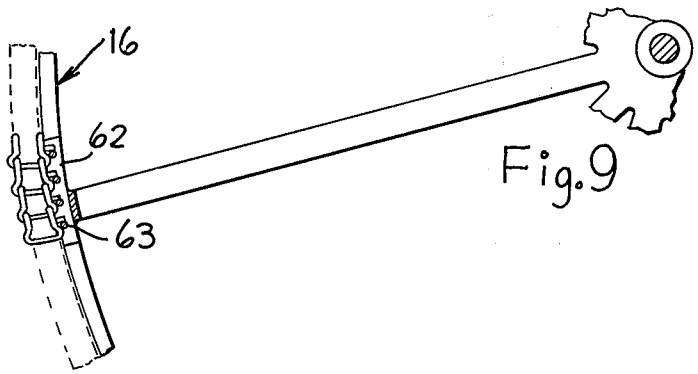
FIG. 9 is a partially broken-away, schematic plan view showing how the conveyor chain can be moved by a sprocket rotating about a vertical axis.

Further, as illustrated in FIG. 9, the ears 33 can engage a large-diameter sprocket 16 rotatable about a vertical axis when the direction of movement of the chain is to be changed through a relatively large arc. For this purpose, the ears 33 are receivable in a slot 62 in the periphery of the sprocket 16 and they are engaged by vertical pins 63 extending through the slot in order to effect driving of the conveyor chain. It will also be understood that the ears 33 can be engaged by other suitable drive means, such as a drive sprocket rotatable about a horizontal axis.

It will thus be understood that the conveyor chain 22 is capable of providing effective support for the load supporting members 23 and is capable of engaging suitable guide and/or drive means in order that the conveyor can be moved uniformly and smoothly through various complex paths, including paths having both vertical and horizontal components of movement. A particularly important aspect of the invention is the provision of the ears 33 which are effective to provide precise guiding and driving movements of the conveyor so that it will move smoothly and uniformly through the desired path.

Figure 10:
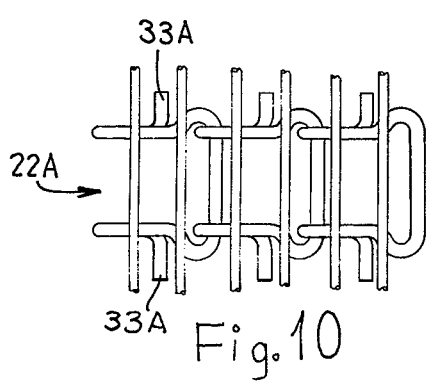
FIG. 10 is a plan view of a modified form of conveyor chain.
Figure 11:
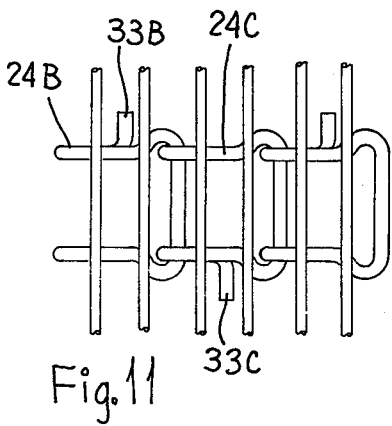
FIG. 11 is a plan view of a second modified form of conveyor chain.

Referring to FIG. 10, there is illustrated a modified chain 22A in which both of the reversely curved end portions of the legs have ears 33A projecting therefrom. This is a modification of more general utility because the guiding and driving movements can take place on either side of the chain. FIG. 11 illustrates a second modification of the chain in which adjacent links 24B and 24C have legs 33B and 33C projecting in opposite sideward directions. This also permits driving and guiding of the chain from both sides thereof, but with somewhat reduced control of the chain movement.

It will be observed that the chain structure is very simple because it consists of repeating chain links of identical or substantially identical shape and made of one-piece rod stock. Further, the chain links are of open construction so that there is little opportunity for waste particles to collect in pockets or dead spaces therein. It will be noted that the normal working and flexing of the chain is sufficient to dislodge particles which may tend to accumulate in the slots. Moreover, because of its relatively open constructions, the chain can be easily cleaned as the need arises.

A modified drive arrangement 40 is illustrated in FIGS. 12 and 13. This arrangement can be used in lieu of the sprockets 16, or in combination therewith, to effect movement of the conveyor 11. The drive arrangement 40 comprises a pair of endless chains 41 driven by sprockts 42. The chains 41 have lugs 43 pivotally mounted thereon at spaced positions therealong. As the lugs 43 move along the upper reach of the chain, they contact and are supported by an upper guide rail 44 so as to project upwardly into driving engagement with the bights 26 of selected links 24 so that the conveyor is advanced in synchronism with the movement of the chains 41. The leading end 44A of the upper guide rail 44 permits the lugs to pivot clockwise as appearing in FIG. 12 to a position out of engagement with the links 24 as the lugs approach the leading end of the upper reach of the chains. The trailing end 44B of the guide rail pivots the lugs 43 clockwise into driving engagement with the links 24 adjacent the trailing end of the upper reach of the chain. As illustrated in FIG. 12, the lugs 43 have a tip portion 46 for engaging the bight 26 of a link and the remainder 47 of the upper edge thereof is inclined downwardly and rearwardly so as to clear the bight of the adjacent trailing link. The pivot axis 48 of the lugs 43 is substantially directly below the tip portion 46 thereof.

The drive arrangement 40 also comprises a shaft 49 for driving the sprockets 42, a pair of side plates 51 between which the chains are disposed and a lower guide rail 52 for supporting the lugs 43 as they move along the lower reach of the chains. The side plates have upper edges 53 for supporting the load supporting members 23. Inwardly projecting flanges 54 are also provided adjacent the upper ends of the side plates 51 for covering purposes.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a conveyor system, the combination comprising: an elongated endless conveyor chain having load-supporting members thereon, said chain comprising a series of interconnected links, each link being substantially U-shaped in plan view and being made of one-piece rod stock bent to form a transversely extending bight and a pair of substantially parallel, transversely spaced-apart legs extending from the opposite ends of the bight in the same direction longitudinally of the chain, each of said legs comprising an upper intermediate portion connected at one end thereof to said bight and a reversely curved end portion extending downwardly from the other end of said upper intermediate portion and thence extending lengthwise of said upper intermediate portion partway to said bight and being disposed directly under said upper intermediate portion, the reversely curved end portions of said legs defining a slot through which extends the bight of the adjacent link, whereby the links are connected together for relative hinging movement in sideward and vertical directions, the inner end of the reversely curved portion of at least one of said legs being defined by an outwardly turned transverse ear that projects sidewardly from the chain and extends sidewardly beyond the corresponding end of the bight for engagement with a guide or driving device.

2. A conveyor system according to claim 1, in which the length of said bight is larger than the transverse spacing between said intermediate portions of said legs, said bight is offset downwardly from said intermediate portions and is aligned with said slot and the ends of said bight are connected to the adjacent ends of the intermediate portions of said legs by upwardly inclined, inwardly curved connecting portions.

3. A conveyor system according to claim 2, in which said intermediate portions are substantially straight and coplanar.

4. A conveyor system according to claim 3, in which said load supporting members are elongated rods or slats secured at their central portions to said intermediate portions of said legs and projecting in both sideward directions therefrom.

5. A conveyor system according to claim 2, in which said ear projects sidewardly at a location close to the juncture of said connecting portion and said intermediate portion of said leg, said ear projecting sidewardly beyond said connecting portion.

6. A conveyor system according to claim 5, in which both of said legs have ears projecting in opposite directions sidewardly of the chain.

7. A conveyor system according to claim 2, in which the vertical and longitudinal dimensions of the inner end of said slot are larger than the rod thickness of the bight so that the bight of the adjacent link can move longitudinally in said slot, the vertical dimension at the outer end of said slot being smaller than the rod thickness of the bight so that the bight of the adjacent link is retained in said slot.

8. A conveyor system according to claim 1, including an endless drive member having lugs thereon for engaging the bights of said links for advancing said conveyor chain.

9. A conveyor system according to claim 8, in which said drive member comprises endless chain means disposed below said conveyor chain, sprocket means for effecting unidirectional movement of said chain means, said lugs being pivotally mounted on said chain means and guide rail means for supporting and positioning said lugs so that they drivingly engage the bights of said links as they move along the upper reach of said chain means.

* * * * *